US012784292B2

(12) United States Patent
Krüger et al.

(10) Patent No.: US 12,784,292 B2
(45) Date of Patent: Nov. 3, 2026

(54) SYSTEM AND METHOD FOR VISUALIZING MOVEMENT OF A DETECTED OBJECT IN A SCENE

(71) Applicant: Axis AB, Lund (SE)

(72) Inventors: Anders Krüger, Lund (SE); Emma Samuelsson, Lund (SE)

(73) Assignee: Axis AB, Lund (SE)

( * ) Notice: Subject to any disclaimer, the term of this patent is extended or adjusted under 35 U.S.C. 154(b) by 174 days.

(21) Appl. No.: 18/432,560

(22) Filed: Feb. 5, 2024

(65) Prior Publication Data

US 2024/0273777 A1 Aug. 15, 2024

(30) Foreign Application Priority Data

Feb. 14, 2023 (EP) .................................... 23156497

(51) Int. Cl.

*G06T 11/00* (2026.01)
*G06T 7/20* (2017.01)
*G06T 7/70* (2017.01)

(52) U.S. Cl.

CPC ................ *G06T 11/00* (2013.01); *G06T 7/20* (2013.01); *G06T 7/70* (2017.01); *G06T 2207/10016* (2013.01)

(58) Field of Classification Search

CPC .............. G06T 11/00; G06T 7/70; G06T 7/20
See application file for complete search history.

(56) References Cited

U.S. PATENT DOCUMENTS 8,605,155 B2 12/2013 Kelly, III et al.
2003/0085992 A1* 5/2003 Arpa ..................... G06T 15/205 348/E7.086
2015/0294496 A1 10/2015 Medasani et al.
2017/0048334 A1* 2/2017 Shibahara .............. H04N 5/265
2018/0101737 A1* 4/2018 You ...................... G06V 20/588
2018/0361240 A1* 12/2018 Ikenoue .................. G06F 3/011
2020/0357131 A1 11/2020 Eno et al.
2021/0409655 A1* 12/2021 Kerst ...................... G06T 7/593

OTHER PUBLICATIONS

Angle Ratio provided from Google search for common knowledge.*
Extended European Search Report issued on Jul. 24, 2023 for European Patent Application No. 23156497.2.
Lo Presti, et al., "Activity Monitoring Made Easier by Smart 360-degree Cameras," ECCV 2022: Computer Vision—ECVV 2022 Workshops, Oct. 24, 2022.
Lo Presti, et al., "Depth-Aware Multi-object Tracking in Spherical Videos", May 15, 2022.

(Continued)

*Primary Examiner* — Yi Yang
(74) *Attorney, Agent, or Firm* — Volpe Koenig

(57) ABSTRACT

A system and a method for visualizing movement of a detected object in a scene are disclosed. For each image of a sequence of images captured by a camera and depicting the scene: information is obtained indicating a location in horizontal direction in the image of the detected object, and a graphical shape is displayed on a display in a 2-dimensional graphical representation of a field of view of the camera in a horizontal plane, wherein the graphical shape has a location in the 2-dimensional graphical representation representing the location in horizontal direction in the image of the detected object.

7 Claims, 4 Drawing Sheets

(56) References Cited

OTHER PUBLICATIONS

Khan, S. M. et al., "Tracking Multiple Occluding People by Localizing on Multiple Scene Planes," in IEEE Transactions on Pattern Analysis and Machine Intelligence, vol. 31, No. 3, pp. 505-519, Mar. 2009.
Börger, J., et al., "Sensor Visibility Estimation: Metrics and Methods for Systematic Performance Evaluation and Improvement," 2022 IEEE 25th International Conference on Intelligent Transportation Systems (ITSC), Macau, China, 2022.
Communication Pursuant to Article 94(3) EPC issued on Dec. 12, 2023 for European Patent Application No. 23156497.2.
Lanza, A., et al., "Robust Multi-View Change Detection," British Machine Vision Conference 2007, University of Warwick, UK.
Ren Jie, et al., "Multi-view visual surveillance and phantom removal for effective pedestrian detection," Multimedia Tools and Applications, Kluwer Academics Publishers, Boston, US, Jun. 22, 2017.
Communication Pursuant to Article 94(3) EPC issued on Apr. 4, 2024 for European Patent Application No. 23156497.2.

* cited by examiner

100

SYSTEM AND METHOD FOR VISUALIZING MOVEMENT OF A DETECTED OBJECT IN A SCENE

TECHNICAL FIELD

The present invention relates to object detection, and specifically to visualizing movement of a detected object in a scene.

BACKGROUND

In prior art camera systems for object detection, a map view in a horizontal plane of a scene is sometimes derived and displayed in a display e.g. for viewing by an operator. In systems where the locations of detected objects in a horizontal plane of the scene can be determined, e.g. by means of radar, lidar etc, the location of a detected object may be identified on the map. When the detected object moves, the location of the detected object may then be updated on the map to visualize the movement of the detected object. However, many camera systems do not include any means for determining the location of the detected objects in the horizontal plane of the scene. In such systems an exact location of the detected objects cannot be identified on the map and hence, movement of a detected object cannot be easily visualized without addition of further means for identifying locations of the detected objects in the horizontal plane of the scene.

SUMMARY OF THE INVENTION

An object of the present invention is to provide a method and a system for visualizing movement of a detected object in a scene which overcome or mitigate issues in prior art.

The present disclosure makes use of a recognition that visualization in a 2-dimensional horizontal plane of a detected object in a field of view of a camera is advantageous to a user, such as an operator, from a perceptional point of view as compared to a sequence of images from a camera, and that information indicating a location in horizontal direction in an image of the detected object in each image of the sequence of images from the camera is sufficient to visualize movement in the 2-dimensional horizontal plane even without access to any information regarding the distance from the camera to the detected object.

According to a first aspect, a method for visualizing movement of a detected object in a scene is provided. For each image of a sequence of images captured by a camera and depicting the scene information is obtained indicating a location in horizontal direction in the image of the detected object, and a graphical shape is displayed in a display in a 2-dimensional graphical representation of a field of view of the camera in a horizontal plane, wherein the graphical shape has a location in the 2-dimensional graphical representation, which location represents the location in horizontal direction in the image of the detected object.

The method of the first aspect is advantageous in a system without means for determining locations of detected objects in a horizontal plane of a scene. The act of obtaining information indicating a location in horizontal direction in the image of the detected object may comprise determining a location in horizontal direction in the image of the detected object by means of analysis of the image.

By knowing a location in horizontal direction in the image, locations in the 2-dimensional graphical representation corresponding to the known location in horizontal direction in the image can be derived. Hence, the graphical shape can be displayed on a display at a location in the 2-dimensional graphical representation that represents the location in horizontal direction of the detected object in the image. By this, a movement of the detected object in horizontal direction between two images in the sequence of images will be visualized by the location of the graphical shape in the 2-dimensional graphical representation changing between the two images.

The information obtained may further indicate an extension in horizontal direction in the image of the detected object. The graphical shape displayed may then be a circle sector having an angle representing the extension in horizontal direction in the image of the detected object and a location representing the location in horizontal direction in the image of the detected object.

By this, a movement of the detected object in horizontal direction over the sequence of images will be visualized by the location of the circle sector in the 2-dimensional graphical representation changing to represent the new location in horizontal direction in the image of the detected object. Furthermore, a movement of the object away from the camera over the sequence of images will be visualized by the angle of the circle sector changing to represent the new decreased extension in horizontal direction of the detected object due to the movement away from the camera.

The circle sector may be such that a first quotient between the angle of the circle sector and a total angle of the field of view of the camera in the 2-dimensional graphical representation is equal to, or at least proportional to, a second quotient between the extension in horizontal direction in the image of the detected object and a horizontal length of the image.

By this, a movement of the detected object away from the camera over the sequence of images will be visualized by a decrease of the angle of the circle sector, which decrease is proportional to the decreased extension in horizontal direction of the detected object due to the movement away from the camera.

The circle sector may be such that a third quotient between a first angle from a closest edge in angular direction of the field of view of the camera in the 2-dimensional graphical representation to the centre of the circle sector and a total angle of the field of view of the camera in the 2-dimensional graphical representation is equal to a fourth quotient between a distance from a closest edge in horizontal direction of the image to the centre of the detected object in the image and a horizontal length of the image.

In alternative, the graphical shape may be a line having a location in the 2-dimensional graphical representation representing the location in horizontal direction in the image of the detected object.

By this, a movement of the detected object in horizontal direction over the sequence of images will be visualized by the location of the line in the 2-dimensional graphical representation changing to represent the new location in horizontal direction in the image of the detected object.

The 2-dimensional graphical representation may be included in a 2-dimensional map of a site in which the camera is mounted.

The act of displaying may be performed without access to information related to a distance between the camera and the detected object in the scene.

In embodiments, the graphical shape has an appearance such that it is distinguishable in the 2-dimensional graphical representation.

In embodiments, the method of the first aspect further comprises for each further image of a further sequence of images captured by a further camera and depicting the scene from a different angle than the camera obtaining information indicating a location in horizontal direction in the further image of the detected object and an extension in horizontal direction in the further image of the detected object, and displaying on the display, in the 2-dimensional graphical representation of the field of view of the camera in the horizontal plane, a further circle sector. The further circle sector has an angle representing the extension in horizontal direction in the image of the detected object and a location representing the location in horizontal direction in the image of the detected object. The further circle sector is further displayed concurrently with a circle sector relating to a corresponding image of the sequence of images, and any overlap between the further circle sector and the circle sector has an appearance such that it is distinguishable in the 2-dimensional graphical representation.

By this, the possible location of the detected object in the 2-dimensional graphical representation can be limited to the overlap between the further circle sector and the circle sector. Furthermore, a movement of the detected object in horizontal direction between two images in the sequence of images and/or in horizontal direction between two corresponding further images in the further sequence of images will be visualized by the location of the overlap in the 2-dimensional graphical representation changing between the two images and the corresponding to further images due to the location of the circle sector changing to represent the new location in horizontal direction of the detected object between the two images and/or the location of the further circle sector changing to represent the new location in horizontal direction of the detected object between the two further images.

According to a second aspect, a non-transitory computer-readable storage medium is provided having stored thereon instructions for implementing the method according to the first aspect when executed by a system having processing capabilities and a display.

The above-mentioned optional features of the method according to the first aspect, when applicable, apply to the non-transitory computer-readable storage medium of the second aspect as well. To avoid undue repetition, reference is made to the above.

According to a third aspect a system for visualizing movement of a detected object in a scene is provided. The system comprises circuitry configured to execute an obtaining function and a displaying function for each image of a sequence of images captured by a camera and depicting the scene. The obtaining function is configured to obtain information indicating a location in horizontal direction in the image of the detected object. The displaying function is configured to display on the display, in a 2-dimensional graphical representation of the field of view of the camera in a horizontal plane, a graphical shape having a location representing the location in horizontal direction in the image of the detected object.

The above-mentioned optional features of the method according to the first aspect, when applicable, apply to the system of the third aspect as well. To avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the system described or acts of the methods described as such system and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

In the following, embodiments of a method 100 for visualizing movement of a detected object in a scene will be discussed with reference to FIG. 1 and FIGS. 2A-E.

Figure 1:
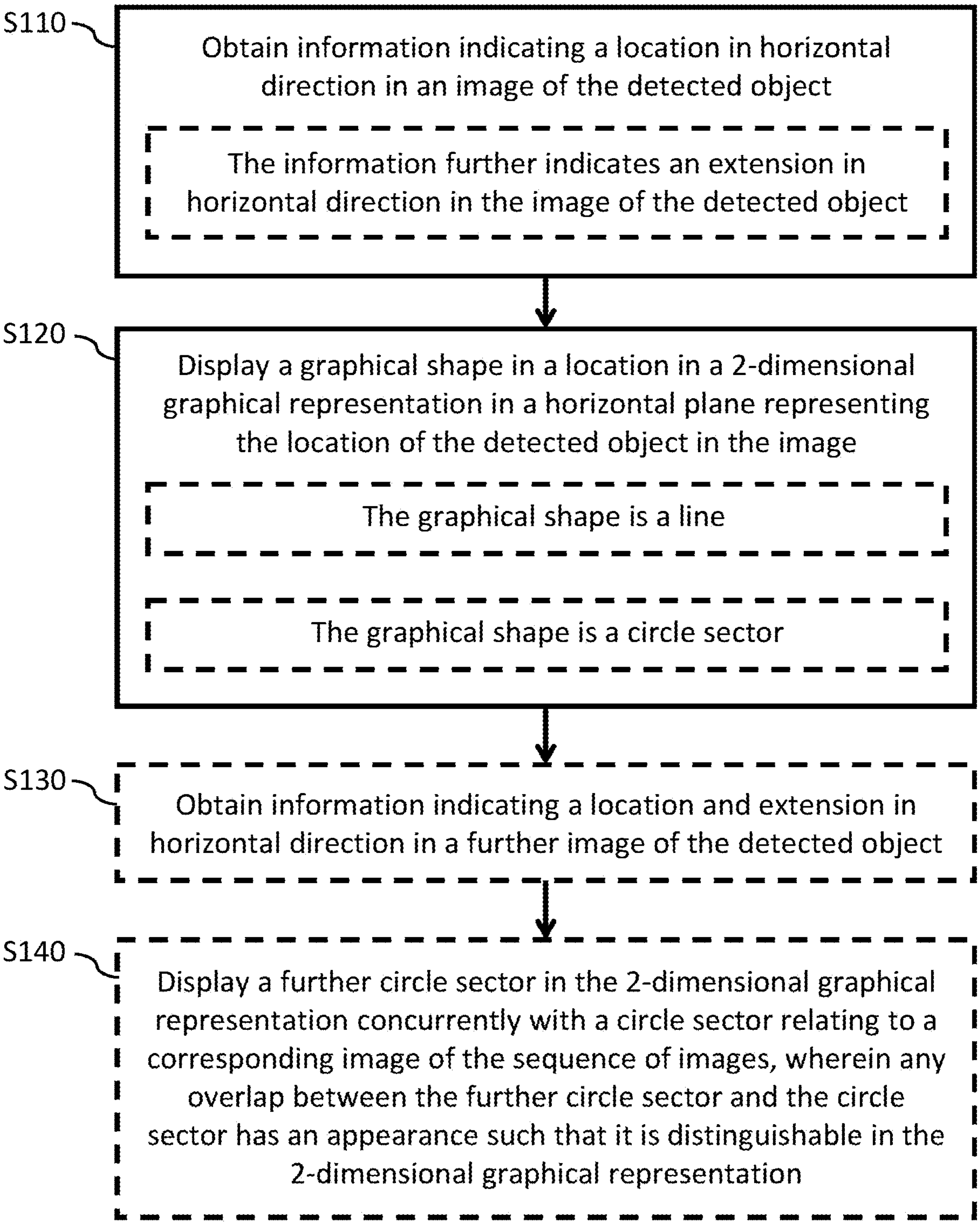
FIG. 1 shows a flow chart in relation to embodiments of a method of the present disclosure.

FIG. 1 shows a flow chart in relation to embodiments of a method 100 for visualizing movement of a detected object in a scene of the present disclosure. Optional features are shown within dashed boxes.

The detected object may have been detected by means of any type of method for object detection, such as using a machine learning model e.g. using a neural network.

For each image of a sequence of images captured by a camera and depicting the scene, information is obtained S110 indicating a location in horizontal direction in the image of the detected object. Furthermore, a graphical shape is displayed S120 on a display in a 2-dimensional graphical representation of a field of view of the camera in a horizontal plane. The graphical shape has a location in the 2-dimensional graphical representation, which location represents the location in horizontal direction in the image of the detected object. As the detected object has an extension in horizontal direction in the image, the location in horizontal direction in the image of the detected object may for example be determined as the objects centre in horizontal direction. However, as it sometimes is of less interest to visualize the exact location of the detected object at a specific time and of more interest to visualize movement, the location in horizontal direction in the image of the detected object may be selected as any portion of the object. Preferably, but not necessarily, the same portion is selected in each image of the sequence of images, such as a rightmost end or leftmost end of the detected object.

The method 100 may for example be performed in real time or near real time, i.e. the information is received in real time when the image of the sequence of images is captured by the camera with only a delay due to determining of the information and the displaying of the graphical shape in the 2-dimensional graphical representation of the field of view of the camera in a horizontal plane is performed as soon as possible thereafter. By this, the movement of the detected object over the sequence of images is visualized in real time or near real time by the movement of the graphical shape in the 2-dimensional graphical representation over the sequence of images.

The camera may be a fixed camera having a fixed field of view or it may be a pant tilt zoom (PTZ) camera. In the latter case the 2-dimensional graphical representation of a field of view of the camera in a horizontal plane may differ between images of the sequence of images if the camera pans, tilts, and/or zooms between the images.

By displaying the graphical shape at a location in the 2-dimensional graphical representation representing the location in horizontal direction in the image of the detected object on a display in a 2-dimensional graphical representation of a field of view of the camera in a horizontal plane in each image of the sequence of images, the graphical shape will move in the 2-dimensional graphical representation if the detected object moves in horizontal direction between images in the sequence of images.

Using visualization in a 2-dimensional horizontal plane of a detected object in a field of view of a camera is advantageous to a user from a perceptional point of view as compared to viewing only the sequence of images from the camera. For example, it is easier for a user to identify how a detected object, e.g. a person, is moving in relation to portions of interest in a site where the camera is located when viewing the graphical shape moving in the 2-dimensional graphical representation as compared when viewing only the movement of the detected object in the sequence of images from the camera.

Using visualization in a 2-dimensional horizontal plane of a detected object in a field of view of a camera is further advantageous to a user in scenarios where the user is not allowed to view the sequence of images from the camera but is allowed to view the 2-dimensional representation of the field of view in the horizontal plane.

Based on visualization of the movement, a user may perform one or more of a multitude of actions or events such as:

identifying neighbouring cameras, the field of view of which the detected object is moving towards identifying that the detected object is moving towards an area of interest/importance in a site controlling the camera for zooming in or out open or closing a door towards which the detected moving switching on or off a light playing a message in one or more loudspeakers triggering an alarm contacting a guard.

The 2-dimensional graphical representation of the field of view of the camera in a horizontal plane does not have to be an exact representation. An approximation is sufficient in order to enable visualization of the movement of the detected object in horizontal direction in the image also as movement of the graphical shape in the 2-dimensional graphical representation of the field of view.

The method 100 is for example advantageous in scenarios where there are no means for determining locations of detected objects in a horizontal plane of a scene. Such scenarios are for example scenarios where there is only the sequence of images available from the camera, and hence, there are no information available regarding the distance from the camera to the detected objects. According to the method 100, information indicating a location in horizontal direction in an image of the detected object in each image of a sequence of images from the camera can be used to visualize movement even without any information regarding the distance from the camera to the detected object.

The act of obtaining S110 information indicating a location in horizontal direction in the image of the detected object may comprise determining a location in horizontal direction in the image of the detected object by means of analysis of the image.

Furthermore, the graphical shape may be visually adapted based on a speed with which the detected object moves in horizontal direction between images in the sequence of images, such that the speed of the detected object in horizontal direction between images in the sequence of images can be visually distinguished from the graphical shape. For example, the graphical shape may have different colours or other visual features depending on the speed of the detected object in horizontal direction between images in the sequence of images. The speed can be calculated by determining the difference between locations in horizontal direction in two images divided by the difference in time between the capturing of the two images.

Figure 2A:
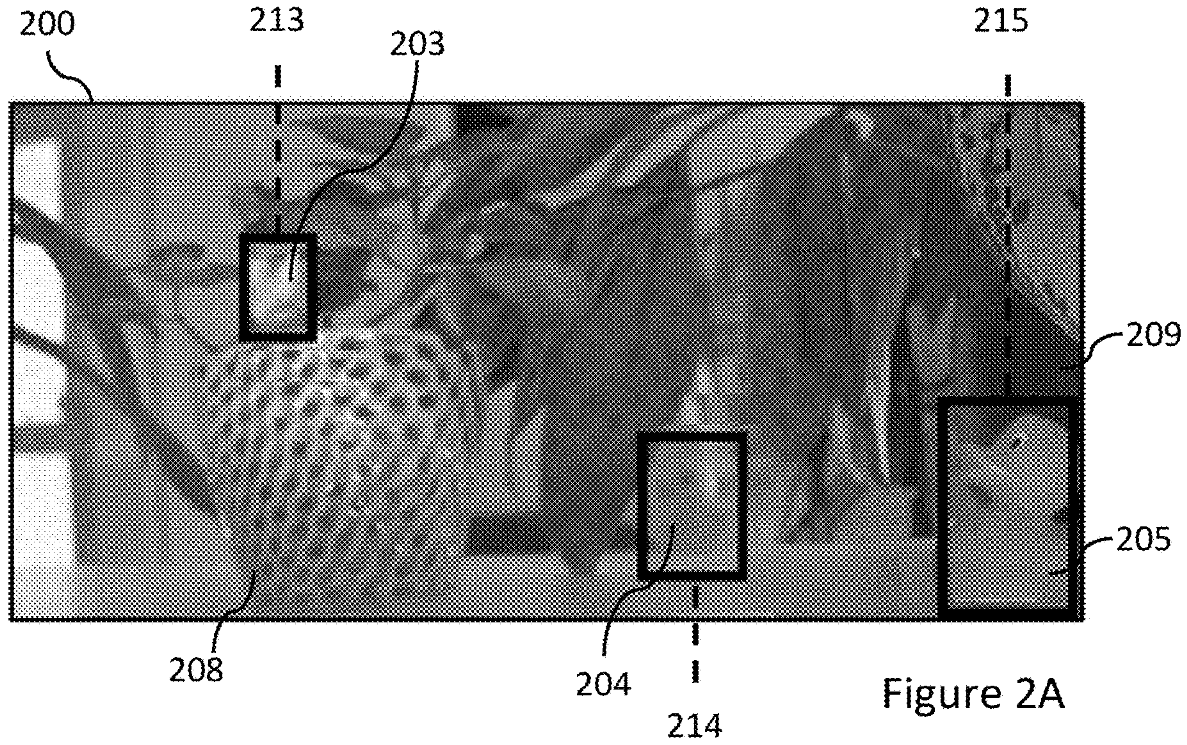
FIG. 2A shows an image of a scene including detected objects, wherein the image is captured by a camera.

Turning to FIG. 2A, in which an image 200 of a scene captured by a camera is depicted. The image 200 comprises a first detected object 203, a second detected object 204, and a third detected object 205. These detected objects 203, 204, 205 represent moving objects in the scene. Additionally, the image 200 comprises objects that do not move, such as a first stationary object 208 and a second stationary object 209. The detected objects 203, 204, 205 each have a respective location in horizontal direction in the image. For example, the location in horizontal direction in the image of the detected object may for example be represented by the objects centre in horizontal direction. The location in horizontal direction in the image of the first detected object 203 is selected as the centre of the first detected object 203 which is indicated by the dashed line 213. Similarly, the location of the second detected object 204 is indicated by the dashed line 214, and the location of the third detected object 205 is indicated by the dashed line 215. In embodiments, the detected objects may be classified by means of a classifier such that the object class is known for some or all detected objects.

Figure 2B:
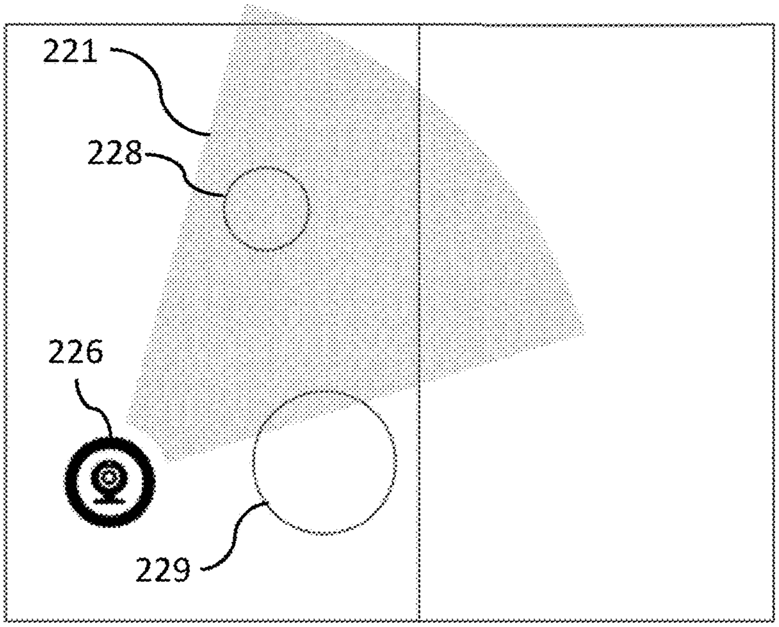
FIG. 2B shows a 2-dimensional graphical representation in a horizontal plane of a portion of a site in which the camera is located in relation to the image shown in FIG. 2A, which representation includes a graphical representation in horizontal plane of the field of view of the camera.

Furthermore, FIG. 2B shows a 2-dimensional graphical representation in a horizontal plane of a portion of a site in which the camera is located in relation to the image 200 of FIG. 2A. The 2-dimensional graphical representation in a horizontal plane of a portion of site includes a 2-dimensional graphical representation 221 of a field of view of the camera in a horizontal plane. The graphical representation 221 of the field of view of the camera may be specifically distinguished or indicated by means of a specific colour such as a grey tone or it may be indicated by lines along its periphery or any other way of visually identifying or distinguishing it. In alternative, the graphical representation 221 of the field of view of the camera need not be specifically identified or distinguished at all. For example, if the 2-dimensional graphical representation 221 of the field of view of the camera is included in a 2-dimensional graphical representation in a horizontal plane of a portion of a site in which the camera is located such as in FIG. 2B, the 2-dimensional graphical representation 221 of the field of view of the camera may not be specifically distinguished or identified in the 2-dimensional graphical representation of the portion of the site. Instead, a relevant feature is that the graphical shape is displayed in the 2-dimensional graphical representation of the portion of the site in a location in relation to the location of the field of view of the camera in the 2-dimensional graphical representation of the portion of the site that represents the location in horizontal direction in the image of the detected object. Hence, the location and movement of the graphical shape may be visualized in relation to other features of the 2-dimensional graphical representation of the portion of the site than in relation to the 2-dimensional graphical representation 221 of the field of view of the camera.

The 2-dimensional graphical representation of the portion of the site may further include graphical representations of other features in the image 200, of the camera, and other features in a site where the camera is located. For example, FIG. 2B includes a first graphical representation 226 of the camera, a second graphical representation 228 of the first stationary object 208, and a third graphical representation 229 of the second stationary object 209. These further graphical representations may be included also when the graphical representation 221 of the field of view of the camera is not specifically identified or distinguished in the 2-dimensional representation. The number of other features, and which other features, graphical representations are included for may vary and may be decided based on the usefulness of having a possibility to visualize movement in relation to such other features whilst at the same time avoid including graphical representations of too many other features and thereby obscuring the graphical shape representing the location of the detected object.

The 2-dimensional graphical representation of the field of view of the camera in a horizontal plane can be included in a 2-dimensional graphical representation of the portion of a site either manually by a user or automatically or as a combination of both. In case of manual inclusion by a user, tools may be provided such that the user clicks on a point in the 2-dimensional graphical representation of the portion of a site where the camera is located, and a default circle sector is the included which the user may then adapt the circle sector, e.g. by adapting its direction and (central) angle. It is further to be noted that the 2-dimensional graphical representation of the field of view of the camera does not have to be a circle sector but may have other shapes representing the field of view, such as a triangular shape. Sensors like a compass and/or gyroscope may give automatic readings of camera direction, if the compass direction is predefined I the 2-dimensional graphical representation of the portion of the site, and installed camera view angle that may be used during an automatic creation and placement of the 2-dimensional graphical representation of the field of view of the camera. The camera may well also know its location, which provides the possibility for a fully automatic generation and placement of the 2-dimensional graphical representation of the field of view. The 2-dimensional graphical representation of the field of view of the camera may further be modified by the user or automatically based on physical limitations in the scene, such as walls, floor and ceiling. Information regarding camera type, lens parameters, height and view angle at which the camera is mounted may be used to further adapt the 2-dimensional graphical representation of the field of view of the camera.

Turning back to FIG. 1, in the act of displaying S120, the graphical shape is a line in a first embodiment. The line has a location in the 2-dimensional graphical representation of the field of view representing the location in horizontal direction in the image of the detected object. For example, the line may be a line starting from the location of the camera in the 2-dimensional graphical representation of the field of view and having a direction that corresponds to all locations the 2-dimensional graphical representation that represent the location in horizontal direction in the image of the detected object.

Figure 2C:
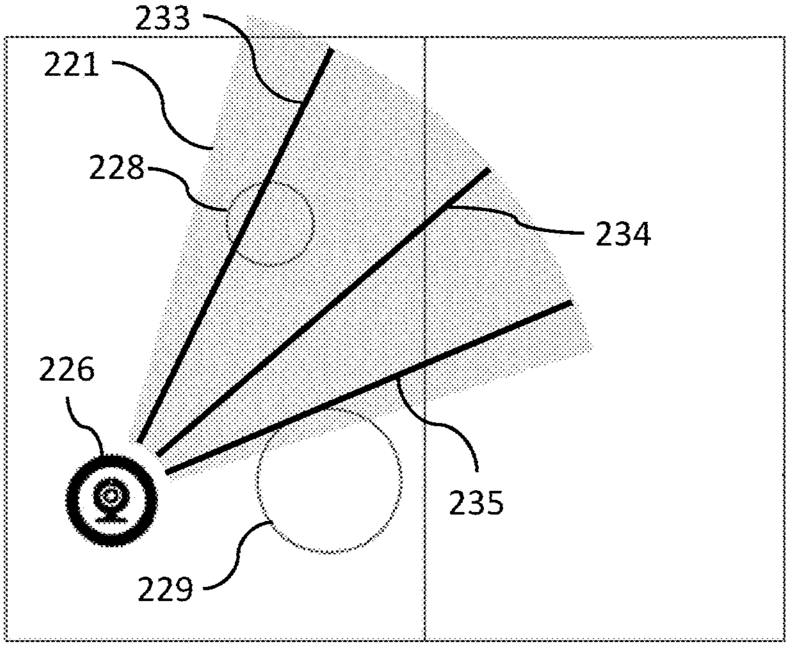
FIG. 2C shows another 2-dimensional representation in a horizontal plane of a portion of a site in which the camera is located in relation to the image shown in FIG. 2A, which representation includes graphical shapes in the form of lines representing the detected objects according to a first embodiment.

Turning to FIG. 2C, which shows another 2-dimensional representation in a horizontal plane of a portion of a site in which the camera is located in relation to the image shown in FIG. 2A. FIG. 2C further includes the 2-dimensional graphical representation 221 of the field of view of the camera in a horizontal plane, the first graphical representation 226 of the camera, the second graphical representation 228 of the first stationary object 208, and the third graphical representation 229 of the second stationary object 209. The 2-dimensional representation of the portion of the site further includes graphical shapes in the form of lines 233, 234, 235 having a respective location representing the location in horizontal direction of the corresponding one of the detected objects 203, 204, 205 in the image 200 according to the first embodiment. For example, each line 233, 234, 235 may start from the location of the camera or in the 2-dimensional graphical representation of the field of view, or at a distance therefrom, and have a direction that corresponds to all locations the 2-dimensional graphical representation of the field of view that represent the location in horizontal direction in the image of the detected object. To this end, the direction for a line in relation to a detected object corresponds to an angle from the closest edge of the 2-dimensional graphical representation of the field of view. The angle can be determined by determining a quotient between the distance from the closest edge in horizontal direction of the image to the centre of the detected object in the image and a total horizontal length of the image, wherein the closest edge in the image is the edge corresponding to the closest edge of the field of view in the 2-dimensional graphical representation. The angle is then determined as the total angle of 2-dimensional graphical representation of the field of view multiplied by the quotient.

The line relating to a detected object should be specifically distinguished from the 2-dimensional graphical representation of the field of view of the camera in a horizontal plane. For example, it may be indicated by means of a specific colour or any other way of visually identifying or distinguishing it from the 2-dimensional graphical representation of the field of view of the camera in a horizontal plane. Furthermore, the line may be solid, dashed, dotted, have different widths, end with an arrow etc.

Furthermore, if the information obtained in the act of obtaining S110 further indicates an extension in horizontal direction in the image of the detected object, a visual indication may be added to the line representing the extension in horizontal direction in the image of the detected object, such as an added line, arrow or other graphical shape perpendicular to the line.

Turning back to FIG. 1, in a second embodiment, the information obtained in the act of obtaining S110 further indicates an extension in horizontal direction in the image of the detected object. Furthermore, in the act of displaying S120, the graphical shape is a circle sector. The circle sector has an angle representing the extension in horizontal direction in the image of the detected object. The circle sector further has a location in the 2-dimensional graphical representation representing the location in horizontal direction in the image of the detected object.

The information obtained in the act of obtaining S110 may include a bounding box in relation to the detected object. In such a case the extension in horizontal direction in the image of the detected object may be determined as the extension in horizontal direction (width) of the bounding box.

Figure 2D:
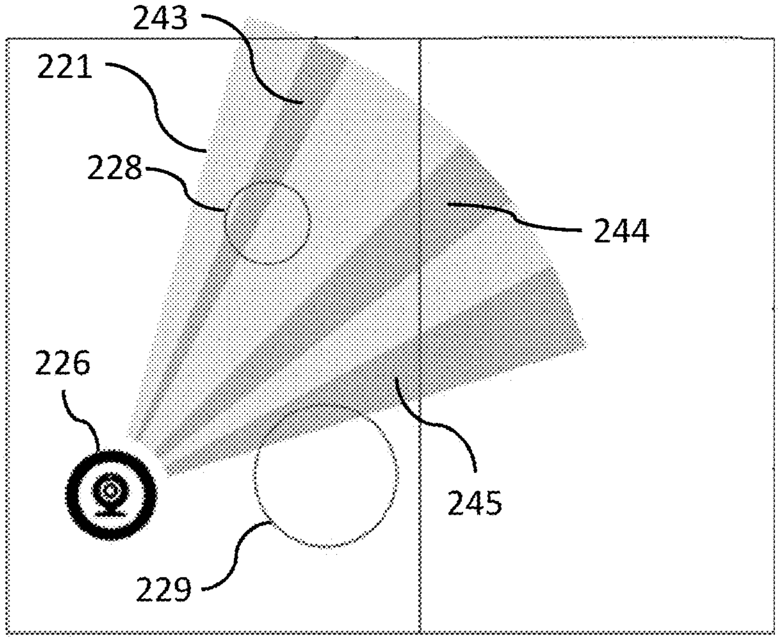
FIG. 2D shows another 2-dimensional representation in a horizontal plane of a portion of a site in which the camera is located in relation to the image shown in FIG. 2A, which representation includes graphical shapes in the form of circle sectors representing the detected objects according to second embodiment.

Turning to FIG. 2D, which shows another 2-dimensional representation in a horizontal plane of a portion of a site in which the camera is located in relation to the image shown in FIG. 2A. The 2-dimensional representation of the portion of the site includes graphical shapes in the form of circle sectors 243, 244, 245 having a respective angle representing the extension in horizontal direction in the image of a corresponding one of the detected objects 203, 204, 205 and respective location representing the location in horizontal direction of a corresponding one of the detected objects 203, 204, 205 in the image 200 according to the second embodiment. FIG. 2D further includes the 2-dimensional graphical representation 221 of the field of view of the camera in a horizontal plane, the first graphical representation 226 of the camera, the second graphical representation 228 of the first stationary object 208, and the third graphical representation 229 of the second stationary object 209.

The angle of a circle sector in relation to a detected object may be determined such that a first quotient between the angle of the circle sector and a total angle of the field of view of the camera in the 2-dimensional graphical representation is equal to a second quotient between the extension in horizontal direction in the image of the detected object and a horizontal length of the image. As can be seen in FIG. 2D, the angle of the circle sector 243 relating to the first detected object 203 is smaller than the circle sector 244 relating to the second detected object as is consistent with the fact that the extension in horizontal direction of the first detected object 203 is smaller than the extension in horizontal direction of the second detected object 204 in the image 200 of FIG. 2A. Having the angle of the circle sector relating to a detected object being determined in this way will result in the angle increasing if the detected object moves away from the camera and the angle decreasing if the detected object moves towards the camera. Hence, a movement of the detected object in direction towards or away the camera will be visualized. Furthermore, this does not require any knowledge of the distance to the detected object from the camera. Additionally, having the angle of the circle sector relating to a detected object being determined in this way will result the circle sector indicating the potential areas of the field of view the detected object is located.

The circle sector relating to a detected object should be specifically distinguished from the 2-dimensional graphical representation of the field of view of the camera in a horizontal plane. For example, it may be indicated by means of a specific colour such as a grey tone or it may be indicated by lines along its periphery or any other way of visually identifying or distinguishing it from the 2-dimensional graphical representation of the field of view of the camera in a horizontal plane.

A circle sector relating to a detected object may be located in the 2-dimensional graphical representation of the field of view of the camera in a horizontal plane such that a third quotient between a first angle from the closest edge in angular direction of the field of view of the camera in the 2-dimensional graphical representation to the centre of the circle sector and the total angle of the field of view of the camera in the 2-dimensional graphical representation is equal to a fourth quotient between the distance from a closest edge in horizontal direction of the image to the centre of the detected object in the image and the horizontal length of the image.

Turning back to FIG. 1, in a third embodiment, the method 100 further comprises, further acts of obtaining S130 and displaying S140 are performed for each further image of a further sequence of images captured by a further camera and depicting the scene from a different angle than the camera. In the further act of obtaining S130, information is obtained indicating a location in horizontal direction in the further image of the detected object and an extension in horizontal direction in the further image of the detected object. In the act of displaying S140, a further circle sector having an angle representing the extension in horizontal direction in the further image of the detected object and a location in the 2-dimensional graphical representation representing the location in horizontal direction in the further image of the detected object is displayed on the display in the 2-dimensional graphical representation of the field of view of the camera in the horizontal plane. The further circle sector is displayed concurrently with a circle sector relating to a corresponding image of the sequence of images, and wherein any overlap between the further circle sector and the circle sector has an appearance such that it is distinguishable in the 2-dimensional graphical representation.

By a corresponding image of the sequence of images is meant an image of the sequence of images that is captured at the same time as the further image of the further sequence of images to which the further circle sector relates.

In the first embodiment, the second embodiment, and the third embodiment, the information obtained in the act of obtaining S110 may further indicate an object class of the detected object. Furthermore, in the act of displaying S120, the graphical shape may then further include a representation of the object class, such as an icon illustrating the object class. Additionally or alternatively, the object class may be represented by a different colour of the graphical shape depending on object class, by a different shape of the graphical shape depending on object class, by a different type of edges of the graphical shape depending on object class, etc.

Figure 2E:
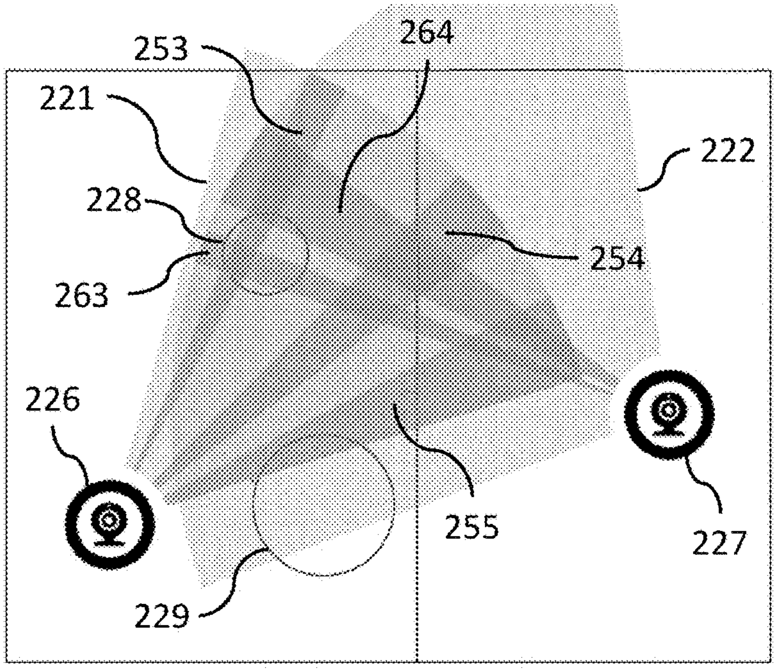
FIG. 2E shows yet another 2-dimensional representation in a horizontal plane of a portion of a site in which the camera and a further camera is located in relation to the image shown in FIG. 2A and another image captured the further camera having a different angle in relation to the scene, wherein the representation includes graphical shapes in the form of circle sectors representing the detected objects according to a third embodiment.

Turning to FIG. 2E, which shows yet another 2-dimensional representation in a horizontal plane of a portion of a site in which the camera and a further camera is located in relation to the image shown in FIG. 2A and another image captured the further camera having a different angle in relation to the scene. The 2-dimensional representation of the portion of the site includes graphical shapes in the form of circle sectors 253, 254, 255 having a respective angle representing the extension in horizontal direction of the corresponding one of the detected objects 203, 204, 205 in the image 200 and a respective location representing the location in horizontal direction of the corresponding one of the detected objects 203, 204, 205 in the image 200. The 2-dimensional representation of the portion of the site further includes graphical shapes in the form of circle sectors 263, 264 having a respective angle representing the extension in horizontal direction of the corresponding one of the detected objects 203, 204 in the further image (not shown) and a respective location representing the location in horizontal direction of the corresponding one of the detected objects 203, 204 in the further image (not shown) according to the third embodiment. FIG. 2E further includes the 2-dimensional graphical representation 221 of the field of view of the camera in a horizontal plane, a 2-dimensional graphical representation 222 of the field of view of the further camera in a horizontal plane, the first graphical representation 226 of the camera, the second graphical representation 228 of the first stationary object 208, and the third graphical representation 229 of the second stationary object 209, and a fourth graphical representation 227 of the further camera.

The locations and angles of the circle sectors 253, 254, 255 relating to the camera and the circle sectors 263, 264 relating to the further camera according to the third embodiment may be determined in the same way as the locations and angles the circle sectors 243, 244, 245 relating to the camera according to the second embodiment.

As can be seen in FIG. 2E, the field of view of the further camera overlaps the field of view of the camera in a horizontal plane. Furthermore, the circle sectors 253, 254, 255 relating to the camera overlap the circle sectors 263, 264 relating to the further camera represent areas in the 2-dimensional graphical representation of the field of view of the camera in the horizontal plane in which the detected objects 203, 204, 205 are located. The overlapping portions between circle sectors and further circle sectors represent areas in the 2-dimensional graphical representation of the field of view of the camera in the horizontal plane in which at least a portion of the detected objects 203, 204, 205 are located. Specifically, in FIG. 2E, the further camera detects two objects as illustrated by the two circle sectors 263, 264 relating to the further camera. Hence, at least two of the detected objects 203, 204, 205 are located in the overlapping portions. As such, they have an appearance that distinguish them from the rest of the areas of the circle sectors and from the graphical representations of the field of views of the camera and further camera. For example, the overlap may have a different shade of the same colour as the circle sectors, or it may have a different colour. Additional or alternative ways of distinguishing the overlapping portions are possible such as having a different type of edges around the overlapping portions than the edges around the rest of the graphical shapes. By having more than one camera capturing images of a scene at different angles, the location of the detected objects in the 2-dimensional graphical representation of the field of view of the camera can be identified to a more limited area, namely the overlaps, and visualized by providing a distinguishing appearance of the overlaps.

As the third detected object 205 is located such that it is obscured by the second stationary object 209 illustrated by the third graphical representation 229, this object is not detected in the further image captured by the further camera. Hence, from the combined information relating to the camera and the further camera, it is not possible to determine in which overlapping portion between the circle sectors 253, 254, 255 relating to the camera and the circle sectors 263, 264 relating to the further camera the detected objects 203, 204, 205 are located. For example, since the third detected object 205 is only detected in relation to the camera and not the further camera, it is not possible to say whether the third detected object 205 is obscured in or outside the field of view of the further camera, or if it is located at a position such that it is in front of and hence obscuring one of the other detected objects 203, 204 in relation to the further camera.

On condition that information regarding object class is available for the detected objects 203, 204, 205, such information in relation to the camera and the further camera, the overlap in which a detected object is located may be determined in some instances. For example, if the first detected object 203 in relation to the camera is of a known object class different from the object classes of the other detected objects, 204, 205, it can be determined that the first detected object is located in the overlap between the leftmost circle sector 253 in relation to the camera and the leftmost circle sector 263 in relation to the further camera.

Furthermore, if the second detected object 204 and the third detected object 205 are of the same known object class, it is not possible to say whether the third detected object 205 is obscured in or outside of the field of view of the further camera, or if it is located at a position such that it is in front of and hence obscuring the second detected object 204 in relation to the further camera. On the other hand, if the second detected object 204 and the third detected object 205 are of different but known object classes, it is possible to say whether the third detected object 205 is obscured in or outside the field of view of the further camera, or if it is located at a position such that it is in front of and hence obscuring the second detected object 204 in relation to the further camera. Specifically, if the object class of the detected object in relation to the rightmost circle sector 264 of the further camera is the same as the object class of the detected object in relation to the middle circle sector 226 of the camera, the third detected object 205 is obscured in or outside the field of view of the further camera. On the other hand, if the object class of the detected object in relation to the rightmost circle sector 264 of the further camera is not the same as the object class of the detected object in relation to the middle circle sector 226 of the camera, the third detected object 205 is located at a position such that it is in front of and hence obscuring the second detected object 204 in relation to the further camera.

Figure 3:
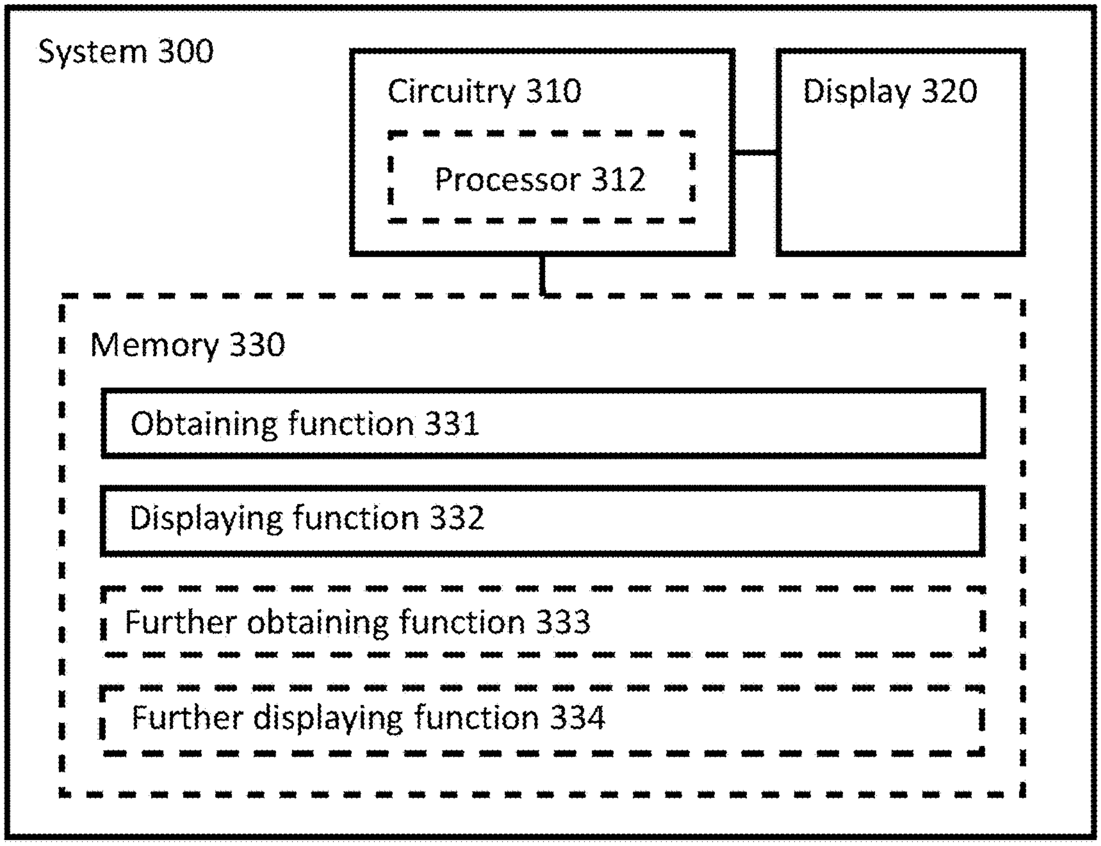
FIG. 3 shows a schematic diagram in relation to embodiments of a system of the present disclosure.

In the following, embodiments of a system 300 for visualizing movement of a detected object in a scene will be discussed with reference to FIG. 3.

The system 300 comprises circuitry 310 and a display 320. The circuitry 310 is configured to carry out functions of the system 300. The circuitry 310 may include a processor 312, such as a central processing unit (CPU), microcontroller, or microprocessor. The processor 312 is configured to execute program code. The program code may for example be configured to carry out the functions of the system 300.

The system 300 may further comprise a memory 330. The memory 330 may be one or more of a buffer, a flash memory, a hard drive, a removable media, a volatile memory, a non-volatile memory, a random access memory (RAM), or another suitable system. In a typical arrangement, the memory 330 may include a non-volatile memory for long term data storage and a volatile memory that functions as system memory for the circuitry 310. The memory 330 may exchange data with the circuitry 310 over a data bus. Accompanying control lines and an address bus between the memory 330 and the circuitry 310 also may be present.

Functions of the system 300 may be embodied in the form of executable logic routines (e.g., lines of code, software programs, etc.) that are stored on a non-transitory computer readable medium (e.g., the memory 330) of the system 300 and are executed by the circuitry 310 (e.g., using the processor 312). Furthermore, the functions of the system 300 may be a stand-alone software application or form a part of a software application that carries out additional tasks related to the system 300. The described functions may be considered a method that a processing unit, e.g. the processor 312 of the circuitry 310 is configured to carry out. Also, while the described functions may be implemented in software, such functionality may as well be carried out via dedicated hardware or firmware, or some combination of hardware, firmware and/or software.

The circuitry 310 is configured to, for each image of a sequence of images captured by a camera and depicting the scene, execute an obtaining function 331, and a displaying function 332.

The obtaining function 331 is configured to obtain information indicating a location in horizontal direction in the image of the detected object.

The displaying function 332 is configured to display on the display, in a 2-dimensional graphical representation of a field of view of the camera in a horizontal plane, a graphical shape having a location in the 2-dimensional graphical representation representing the location in horizontal direction in the image of the detected object.

The information obtained in the obtaining function 331 may further indicate an extension in horizontal direction in the image of the detected object. In the displaying function 332, the graphical shape may then be a circle sector having an angle representing the extension in horizontal direction in the image of the detected object and a location in the 2-dimensional graphical representation representing the location in horizontal direction in the image of the detected object. The circle sector may then be such that a first quotient between the angle of the circle sector and a total angle of the field of view of the camera in the 2-dimensional graphical representation is equal to a second quotient between the extension in horizontal direction in the image of the detected object and a horizontal length of the image.

The circle sector may further be such that a third quotient between a first angle from a closest edge in angular direction of the field of view of the camera in the 2-dimensional graphical representation to the centre of the circle sector and a total angle of the field of view of the camera in the 2-dimensional graphical representation is equal to a fourth quotient between a distance from a closest edge in horizontal direction of the image to the centre of the detected object in the image constitutes of a horizontal length of the image.

In the displaying function 331, the graphical shape may in alternative be a line having a location in the 2-dimensional graphical representation representing the location in horizontal direction in the image of the detected object.

The 2-dimensional graphical representation may further be included in a 2-dimensional map of a site in which the camera is mounted.

The displaying function may be performed without access to information related to a distance between the camera and the detected object in the scene.

The graphical shape may have an appearance such that it is distinguishable in the 2-dimensional graphical representation.

The circuitry 310 may be further configured to, for each further image of a further sequence of images captured by a further camera and depicting the scene from a different angle than the camera, execute a further obtaining function 333, and a further displaying function 334.

The further obtaining function 333 is configured to obtain information indicating a location and extension in horizontal direction in the further image of the detected object.

The further displaying function 334 is configured to display on the display, in the 2-dimensional graphical representation of the field of view of the camera in the horizontal plane, a further circle sector having an angle representing the extension in horizontal direction in the further image of the detected object and a location in the 2-dimensional graphical representation representing the location in horizontal direction in the further image of the detected object, wherein the further circle sector is displayed concurrently with a circle sector relating to a corresponding image of the sequence of images, wherein any overlap between the further circle sector and the circle sector has an appearance such that it is distinguishable in the 2-dimensional graphical representation.

Further details regarding the functions the circuitry 310 is configured to execute are provided in relation to the corresponding acts of the method 100 for visualizing movement of a detected object in a scene as described hereinabove in relation to FIG. 1 and FIGS. 2A-E.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for visualizing movement of a detected object in a scene, comprising:

for each image of a sequence of images captured by a camera and depicting the scene:

obtaining information indicating an extension and a location in a horizontal direction in the image of the detected object; and displaying on a display without access to information related to a distance between the camera and the detected object in the scene, in a 2-dimensional graphical representation of a field of view of the camera in a horizontal plane that is separate from the image captured by the camera, a circle sector having an angle representing the extension in the horizontal direction in the image of the detected object and a location in the 2-dimensional graphical representation representing the location in the horizontal direction in the image of the detected object, wherein a first quotient between the angle of the circle sector and a total angle of the field of view of the camera in the 2-dimensional graphical representation is equal to a second quotient between the extension in the horizontal direction in the image of the detected object and a horizontal length of the image, and wherein a third quotient between a first angle from a closest edge in an angular direction of the field of view of the camera in the 2-dimensional graphical representation to a centre of the circle sector and a total angle of the field of view of the camera in the 2-dimensional graphical representation is equal to a fourth quotient between a distance from a closest edge in the horizontal direction of the image to the centre of the detected object in the image and a horizontal length of the image.

2. The method according to claim 1, wherein the 2-dimensional graphical representation is included in a 2-dimensional map of a site in which the camera is mounted.

3. The method according to claim 1, wherein the circle sector has an appearance such that it is distinguishable in the 2-dimensional graphical representation.

4. The method according to claim 1, wherein a further camera captures a further sequence of images depicting the scene from a different angle than the camera, and wherein an overlap in which a detected object is located is determined when information regarding object class is available for the detected objects in relation to the camera and the further camera.

5. The method according to claim 1, wherein a further camera captures a further sequence of images depicting the scene from a different angle than the camera, and wherein the method includes determining that a first detected object is located in an overlap between the leftmost circle sector in relation to the camera and the leftmost circle sector in relation to the further camera.

6. A non-transitory computer-readable storage medium having stored thereon instructions which, when executed by a system having processing capabilities and a display, cause the system having processing capabilities and a display to perform a method for visualizing movement of a detected object in a scene, comprising:

for each image of a sequence of images captured by a camera and depicting the scene:

obtaining information indicating an extension and a location in a horizontal direction in the image of the detected object; and displaying on a display without access to information related to a distance between the camera and the detected object in the scene, in a 2-dimensional graphical representation of a field of view of the camera in a horizontal plane that is separate from the image captured by the camera, a circle sector having an angle representing the extension in the horizontal direction in the image of the detected object and a location in the 2-dimensional graphical representation representing the location in the horizontal direction in the image of the detected object, wherein the 2-dimensional graphical representation of the field of view of the camera in the horizontal plane is one of a circle sector and a triangle, wherein a first quotient between the angle of the circle sector and a total angle of the field of view of the camera in the 2-dimensional graphical representation is equal to a second quotient between the extension in the horizontal direction in the image of the detected object and a horizontal length of the image, and wherein a third quotient between a first angle from a closest edge in an angular direction of the field of view of the camera in the 2-dimensional graphical representation to a centre of the circle sector and a total angle of the field of view of the camera in the 2-dimensional graphical representation is equal to a fourth quotient between a distance from a closest edge in the horizontal direction of the image to the centre of the detected object in the image and a horizontal length of the image.

7. A system for visualizing movement of a detected object in a scene, which system comprises a display; and circuitry configured to:

for each image of a sequence of images captured by a camera and depicting the scene:

obtain information indicating an extension and a location in a horizontal direction in the image of the detected object; and display on the display without access to information related to a distance between the camera and the detected object in the scene, in a 2-dimensional graphical representation of a field of view of the camera in a horizontal plane that is separate from the image captured by the camera, a circle sector having an angle representing the extension in the horizontal direction in the image of the detected object and a location in the 2-dimensional graphical representation representing the location in the horizontal direction in the image of the detected object, wherein a first quotient between the angle of the circle sector and a total angle of the field of view of the camera in the 2-dimensional graphical representation is equal to a second quotient between the extension in the horizontal direction in the image of the detected object and a horizontal length of the image, and wherein a third quotient between a first angle from a closest edge in an angular direction of the field of view of the camera in the 2-dimensional graphical representation to a centre of the circle sector and a total angle of the field of view of the camera in the 2-dimensional graphical representation is equal to a fourth quotient between a distance from a closest edge in the horizontal direction of the image to the centre of the detected object in the image and a horizontal length of the image.

* * * * *